United States Patent
Karmann et al.

(10) Patent No.: US 6,294,598 B1
(45) Date of Patent: Sep. 25, 2001

(54) USE OF MONOTHIOLS AS STABILIZERS IN MELTED PRESSURE-SENSITIVE ADHESIVE COMPOSITIONS BASED ON NATURAL RUBBER OR SYNTHETIC RUBBERS

(75) Inventors: Werner Karmann; Claus Grobe, both of Hamburg (DE)

(73) Assignee: Beiersdorf AG, Hamburg (DE)

( * ) Notice: Subject to any disclaimer, the term of this patent is extended or adjusted under 35 U.S.C. 154(b) by 0 days.

(21) Appl. No.: 09/328,286

(22) Filed: Jun. 8, 1999

(30) Foreign Application Priority Data

Jun. 12, 1998 (DE) .............................. 198 26 103

(51) Int. Cl.[7] .................................................. C08K 5/3447
(52) U.S. Cl. ................................ 524/93; 524/92; 524/392
(58) Field of Search ........................... 524/236, 392, 524/93, 92

(56) References Cited

U.S. PATENT DOCUMENTS 4,946,879 * 8/1990 Wideman et al. ..................... 524/274
5,049,417 * 9/1991 Tsubota et al. ....................... 427/208.6
5,502,085 * 3/1996 Ohura et al. ............................ 524/833

FOREIGN PATENT DOCUMENTS

| 904778 | * | 3/1999 | (EP) . | |
| 131075 | * | 10/1980 | (JP) | 524/92 |
| 183740 | * | 10/1983 | (JP) | 524/93 |

OTHER PUBLICATIONS

English Translation of 58–183740, Oct. 1983.*

English Translation of 55–131075, Oct. 1980.*

* cited by examiner

*Primary Examiner*—Peter Szekely
(74) *Attorney, Agent, or Firm*—Norris McLaughlin & Marcus

(57) ABSTRACT

Use of solid, rubber-soluble or rubber-dispersible monothiols as stabilizers in melted pressure-sensitive adhesive compositions based on natural rubber or synthetic rubbers, suitable tackifying resins and promoters for increasing the radiation crosslinking yield.

6 Claims, No Drawings

USE OF MONOTHIOLS AS STABILIZERS IN MELTED PRESSURE-SENSITIVE ADHESIVE COMPOSITIONS BASED ON NATURAL RUBBER OR SYNTHETIC RUBBERS

The invention relates to the use of monothiols.

Pressure-sensitive adhesive compositions based on natural rubber/resin mixtures are normally prepared in solvents. To produce adhesive tapes, these solutions are applied as thin films to backings, dried, and cut into tapes. This requires laborious operating processes, expensive explosion-protected coating and drying plants, and costly incinerators or recovery units.

A very much more cost-effective method is the preparation of hotmelt compositions. SBS and SIS block copolymers are normally employed for this purpose. Since the properties of these adhesives are limited relative to those based on natural rubber and since the raw materials costs are higher, they have become established only in certain sectors.

Particular advantages are possessed, therefore, by hotmelt pressure-sensitive adhesive compositions based on natural rubbers or synthetic diene rubbers such as IR and SBR. Because these rubbers have to be broken down to a relatively low molecular weight for solventless processing, an effective crosslinking process is required after coating. The efficacy of the radiation crosslinking of these compositions can be raised considerably by adding small amounts of polyfunctional (meth)acrylates as crosslinking promoters.

During the preparation and application process, melted adhesive compositions are subject to very high temperatures for a prolonged period. During this period it is found that they tend to gel and, subsequently, can no longer be shaped into thin films with smooth surfaces.

The stabilization of hot melts of polydiene rubbers for hotmelt pressure-sensitive adhesives is known to be difficult: In the presence of atmospheric oxygen these compositions tend towards degradation. The known antioxidants are active in countering this tendency, but their activity is limited. At relatively long residence times, the oxygen must be excluded in order to keep properties stable. This exclusion can be achieved by displacing the air with nitrogen, carbon dioxide or the like, or else by avoiding air spaces.

Under oxygen-free conditions, the rubber compositions tend to gel. This is the case in particular when crosslinking promoters have been added to increase the radiation crosslinking. The usual antioxidants employed in the rubber and adhesives industry are inactive in countering this. If added in higher concentrations, they increase the required dose for radiation crosslinking.

WO 97/07963 (Munson et al.) therefore describes the addition of "Non-Thermosettable Phenolic Tackifying Resins", which, surprisingly, not only provides the tackifying effect but also stabilizes the adhesive composition at high temperatures. This applies both to the untreated adhesive composition and to those compositions to which bis-maleimides have been added to enhance the radiation crosslinkability. The effect on the adhesive properties, however, limits the freedom to vary the selection and combination of the tackifying resins.

The object of the invention was to find additives which prevent this gelling but do not impair the properties of the adhesive compositions, especially their radiation crosslinkability. A further requirement was that the substances emit no health-injurious or disruptive vapors at the necessary temperatures.

This object is achieved in accordance with the present invention by the use of solid, rubber-soluble or rubber-dispersible monothiols as stabilizers in melted pressure-sensitive adhesive compositions based on natural rubber or synthetic rubbers, suitable tackifying resins, and promoters for increasing the radiation crosslinking yield.

In a preferred embodiment, the monothiol is 2-mercaptobenzimidazole or substituted derivatives, especially 4-(and/or 5)-methyl-2-mercaptobenzimidazole.

In order to increase further the activity of the mercaptans, it is possible for at least one liquid phosphite ester compatible with the rubber to be additionally present. Finally, the inventive concept embraces in general a melted pressure-sensitive adhesive composition based on natural rubber or synthetic rubbers, suitable tackifying resins and promoters for increasing the radiation crosslinking yield, comprising solid, rubber-soluble or rubber-dispersible monothiols as stabilizers and, if desired, at least one liquid phosphite ester compatible with the rubber.

The monothiol employed in accordance with the invention is conventionally used in the rubber industry as a stabilizer and as a retarder for vulcanization with sulphur-containing systems.

For example, 4-(and/or 5)-methyl-2-mercaptobenzimidazole is available under the name Vulkanox ® MB 2 as an ageing inhibitor from Bayer AG, Leverkusen, DE. Proposed areas of use for Vulkanox ® MB 2 include mixtures based on natural rubber and synthetic rubber of the SBR and NBR type, in which Vulkanox® MB 2 shows a protective activity against oxidization and against the damaging consequences of overvulcanization. This retarder activity is tied to sulphur vulcanization.

Sulphur compounds normally lead in many cases—especially after exposure to ionizing radiation—to the formation of highly unpleasant odor components, which surprisingly does not occur with the mercaptobenzimidazoles of the invention.

It is also known that in many polymers (polyethylene, polyacrylates, etc.) monothiols greatly reduce the crosslinking yield. Surprisingly, this effect too is absent from the melted rubber compositions of the invention.

The behavior of these monothiols as stabilizers in melted pressure-sensitive adhesive compositions based on natural rubbers or synthetic rubbers and suitable tackifying resins and treated with crosslinking promoters was previously unknown.

Surprisingly, and unforeseeably for the person skilled in the art, the monothiols employed in accordance with the invention, even when added in small amounts, represent effective stabilizers for the said adhesive compositions if the said compositions comprise promoters for increasing the radiation crosslinking yield. Suitable crosslinking promoters are primarily polyfunctional (meth)acrylates such as hexanediol diacrylate (HDDA), trimethylolpropane triacrylate (TMPTA), pentaerythritol tetraacrylate (PETA) and their ethoxylated, propoxylated or dimerized derivatives.

The activity described can be increased further by adding phosphite esters.

The aim of the following examples is to demonstrate the unexpected suitability of these monothiols as stabilizers without thereby wishing to restrict the invention.

In order to be able to characterize the stabilizer activity, the stability of the compositions following gelling by temperature exposure was assessed. The radiation crosslinkability of the adhesive compositions was determined by measuring the gel content. This was done using the techniques set out below.

1. Investigating the Stability by Assessing Gelling

Since it is very difficult to investigate the stability of the adhesive compositions in actual coating units, the activity of the substances with regard to the stability of the adhesive compositions was tested in a model experiment. For this purpose the adhesive compositions were shaped into spheres measuring about 10 mm and were introduced into a cylinder from which the atmospheric oxygen was then largely removed by flushing several times with nitrogen. The cylinder was subsequently heated at 140° C. for about 30 minutes under a pressure of 3–4 bar of nitrogen.

After heating, small amounts of the samples were shaken with 20 times the amount of toluene for 20 h, and gelling was assessed in accordance with the key specified in Table 1:

TABLE 1

| Key for assessing gelling after heating | |
|---|---|
| 0 | forms a clear solution, no macrogel |
| 1 | slight streaking, very little gel |
| 2 | some gel flakes, some gel |
| 3 | noticeable gel flakes |
| 4 | swollen gel lump |

2. Measuring the Gel Content to Determine the Degree of Crosslinking

The adhesive tape samples for analysis were punched into square sections of 20 cm$^2$ and welded into a pouch made of a polyethylene spun bonded material (Tyvek from DuPont with a basis weight of about 55 g/m$^2$). The samples were extracted with toluene for 3 days with shaking, the toluene being changed each day. The toluene was then replaced by hexane/heptane and the samples were dried at about 110 C.

The gel content was determined by differential weighing taking into account extraction losses of the spun bonded material and of the backing.

EXAMPLE 1

The following components were kneaded to homogeneity in a Sigma kneader in a mixture of 80 parts of mineral spirits (boiling range 65 to 90° C.) and 20 parts of toluene:

| | |
|---|---|
| Natural rubber SMR CV 50 | 48.75% |
| Resin 115 <#> | 48.75% |
| Phenolix antioxidant <+> | 0.5% |
| Ebecryl 160 <++> | 2.0% |

(<#> Polyterpene resin with softening point of 115° C.)
(<+> Ralox 46-P from Raschig AG, Ludwigshafen, DE)
(<++> Ethoxylated trimethylolpropane triacrylate from UCB-Chemie GmbH, Kerpen, DE)

The stabilizers specified in Table 2 in the concentrations indicated (based on dry mass) were mixed into the above mixture. The resultant compositions were applied to release paper and dried at room temperature for about 16 h. They were then formed into spheres as described above and the stability was measured. The results are summarized in Table 2.

TABLE 2

Stability of the compositions after heating under nitrogen

| Substance | Conc. (%) | Gelling in accordance with Table 1 |
|---|---|---|
| None | — | 4 |
| Ralox 46-P <1> | 2 | 4 |

TABLE 2-continued

Stability of the compositions after heating under nitrogen

| Substance | Conc. (%) | Gelling in accordance with Table 1 |
|---|---|---|
| Irganox 1010 <2> | 2 | 4 |
| Irganox 1035 <3> | 2 | 4 |
| Weston 399 <4> | 0.5 | 3 |
| Irganox 565 <5> | 2 | 3 |
| Irganox PS 802 <6> | 2 | 3 |
| Lowinox AH 25 <7> | 2 | 3 |
| Weston 399 | 1 | 2 |
| MBI <8> | 0.2 | 1 |
| Weston 399 | 2 | 1 |
| Weston 399 + MBI | 0.5 + 0.2 | 0 |

TABLE 3

Substances employed:

| | Chemical composition | Manufacturer/Supplier |
|---|---|---|
| <1> | 2,2'-methylenebis(4-methyl-6-tert-butyl-phenol) | Raschig AG, Ludwigshafen |
| <2> | pentaerythrityl tetrakis(3,5-di-tert-butyl-4-hydroxyhydrocinnamate) | Ciba-Geigy, Basel |
| <3> | 2,2'-thiodiethyl bis(3,5-di-tert-butyl-4-hydroxyhydrocinnamate) | Ciba-Geigy, Basel |
| <4> | tris(nonylphenyl)phosphite | Interorgana GmbH, Cologne |
| <5> | 4-[(4,6-bis[octylthio)-s-triazin-2-yl)amino]-2,6-di-tert-butylphenol | Ciba-Geigy, Basel |
| <6> | β,β'-thiodipropionic acid distearyl ester | Ciba-Geigy, Basel |
| <7> | 2,5-di-tert-amylhydroquinone | Chemische Werke Lowi, Waldkreiburg |
| <8> | Vulkanox MB2/MG 2-mercapto-4(5)-methylbenzimidazole (MBI) | Bayer AG, Leverkusen |

It is evident that MBI is active even in very low concentrations and the activity can be increased substantially by adding small amounts of organic phosphites.

EXAMPLE 2

To examine whether these results can be transferred to the melt, the same basic composition was prepared without solvent.

To accelerate the preparation, a two-stage process was employed: In a first stage, the rubber was kneaded together with the stabilizers and a small amount of tackifying resin at 60 rpm for 4 minutes in an internal laboratory mixer from Werner & Pfleiderer, Stuttgart, DE. 2 millbases with the following composition were prepared:

TABLE 4

Composition of the basic composition

| | millbase Y | millbase Z |
|---|---|---|
| Natural rubber CV 50 | 90.1% | 89.7% |
| Resin 115 | 9% | 9% |
| Colan 46 -(2,2'-methylene-bis(4-methyl-6-t-butyl-phenol)--. | 0.9% | 0.9% |
| MBI | | 0.4% |

In the second stage, these millbases were first preheated at 100° C. for 20 minutes in a melt compounder from Werner & Pfleiderer, Stuttgart, DE. The kneading process was then started and the remaining tackifying resin was added in portions over the course of about 25 minutes, and the mixture was kneaded homogeneously for 20 minutes. Subsequently, the Ebecryl 160 (20% in ethyl acetate) was added in portions over the course of 8 minutes and then the mixture was kneaded homogeneously for 15 minutes.

In the case of the composition D, the Weston 399 (15% in ethyl acetate) was added over the course of 2 minutes prior to the addition of the resin, and the mixture was subsequently kneaded homogeneously for 5 minutes.

Throughout the procedure the atmospheric oxygen was excluded by the introduction of nitrogen. The compositions prepared in this way had the following constitution:

TABLE 5

Constitution of the compositions

| | Composition A | | Composition B | | Composition C | | Composition D | |
|---|---|---|---|---|---|---|---|---|
| | Addition (g) | Content (%) | Addition (g) | Content (%) | Addition (g) | Content (%) | Addition (g) | Content (%) |
| millbase Y | 324.75 | | 324.75 | | | | | |
| millbase Z | | | | | 325.3 | | 323.6 | |
| NR CV50 | | 49.7 | | 48.8 | | 48.7 | | 48.4 |
| Resin 115 | 263.25 | 49.7 | 263.25 | 48.8 | 262.7 | 48.6 | 261.4 | 48.4 |
| Ebecryl 160 | | | 12 | 2.0 | 12 | 2.0 | 12 | 2.0 |
| Colan 46 | | 0.5 | | 0.5 | | 0.5 | | 0.5 |
| MBI | | | | | | 0.2 | | 0.2 |
| Weston 399 | | | | | | | 3 | 0.5 |

These compositions were stored at 160° C. in a closed vessel for varying periods and the gelling was assessed in accordance with Table 1. The results are summarized in Table 6:

TABLE 6

Stability of the adhesive composition

| Period following the addition of the Ebecryl 160 | Comp. A | Comp. B | Comp. C | Comp. D |
|---|---|---|---|---|
| 0 min | 0 | 0 | 0 | 0 |
| 30 min | | 4 | 0 | 0 |
| 60 min | 0 | 4 | 0 | 0 |
| 120 min | 0 | 4 | 0 | 0 |
| 180 min | 0 | 4 | 0 | 0 |
| 240 min | | | | 0 |

It is evident that the stability of the compositions during preparation in the melt compounder and during residence in the piping system has been decisively improved by the addition of the stabilizers.

EXAMPLE 3

In this example, the effect of the stabilizers on radiation crosslinking was examined. For this purpose, adhesive compositions from Example 1 were applied in a thickness of 35 g/m² to PET film, dried at room temperature for 24 h and crosslinked under nitrogen with different radiation doses using an electron accelerator from Polymer-Physik. The acceleration voltage was 200 kV. The radiation dose D was calculated from the beam flux I and the belt speed v using the formula D=K*I/v where K=59.5 (kGy*m)/(mA*min) (W. Karmann; J. of Indust. Irradiation Tech. 1(4), 1983, 305–323).

To characterize the degree of crosslinking, the gel content in toluene was determined in accordance with the above-mentioned method. The results are summarized in Table 7.

TABLE 7

Gel content following EB crosslinking

| Addition | Concentration (%) | Gel content (%) at 20 kGy | Gel content (%) at 50 kGy | Gel content (%) at 70 kGy |
|---|---|---|---|---|
| None | | 17.8 | 37.5 | 39.4 |
| Weston 399 | 2 | 19.8 | 35.9 | 39.9 |
| MBI | 0.5 | 15 | 35.3 | 38.9 |

As is evident, the two most effective stabilizers in the concentration range investigated have the desired effect of not substantially reducing the crosslinking yield.

What is claimed is:

1. Pressure-sensitive adhesive composition comprised of natural rubber or synthetic rubbers, tackifying resins, promoters for increasing the radiation crosslinking yield, an antioxidant consisting essentially of a rubber-soluble or rubber dispersible monothiol and, optionally, at least one liquid phosphite ester compatible with the rubber.

2. A method for stabilizing a melted pressure-sensitive adhesive composition comprised of natural or synthetic rubber, a tackifying resin and a promoter for increasing the radiation crosslinking yield, which comprises adding an antioxidant consisting essentially of a solid, rubber-soluble or rubber-dispersible monothiol to said composition as an antioxidant.

3. Method according to claim 2, wherein the monothiol is 2-mercaptobenzimidazole or a methyl substituted 2-mercaptobenzimidazole.

4. Method according to claim 3, wherein the substituted derivative is 4-methyl-2-mercaptobenzimidazole or 5-methyl-2-mercaptobenzimidazole.

5. Method according to claim 2, wherein polyfunctional (meth)acrylates selected from the group consisting of hexanediol diacrylate (HDDA), trimethylolpropane triacrylate (TMPTA), pentaerythritol tetraacrylate (PETA), their ethoxylated, propoxylated and trimerized derivatives are employed as crosslinking promoters.

6. Method according to claim 2, wherein at least one liquid phosphite ester compatible with the rubber is additionally present.

* * * * *